(12) United States Patent
Caster et al.

(10) Patent No.: US 12,017,573 B2
(45) Date of Patent: Jun. 25, 2024

(54) PATIO FOR RECREATIONAL VEHICLES AND METHODS OF ASSEMBLY

(71) Applicant: MORRYDE INTERNATIONAL, INC., Elkhart, IN (US)

(72) Inventors: Michael Caster, Elkhart, IN (US); Ryan Mason, Niles, MI (US)

(73) Assignee: MORRYDE INTERNATIONAL, INC., Elkhart, IN (US)

( * ) Notice: Subject to any disclaimer, the term of this patent is extended or adjusted under 35 U.S.C. 154(b) by 354 days.

(21) Appl. No.: 17/572,765

(22) Filed: Jan. 11, 2022

(65) Prior Publication Data

US 2022/0219592 A1    Jul. 14, 2022

Related U.S. Application Data

(60) Provisional application No. 63/135,995, filed on Jan. 11, 2021.

(51) Int. Cl.
*B60P 3/34*    (2006.01)
*E04F 11/18*    (2006.01)

(52) U.S. Cl.
CPC .............. *B60P 3/34* (2013.01); *E04F 11/1812* (2013.01); *E04F 11/1857* (2013.01); *E04F 11/1865* (2013.01); *E04F 2011/187* (2013.01)

(58) Field of Classification Search
CPC .... B60P 3/34; B60P 3/36; B60P 1/435; B60P 1/433; B60P 1/4435; E04F 11/1865; E04F 11/1857; E04F 11/1812; E04F 2011/187; B60J 5/107; B62D 33/061

USPC ........................................................ 296/162
See application file for complete search history.

(56) References Cited

U.S. PATENT DOCUMENTS

| | | | |
|---|---|---|---|
| 10,730,372 B2* | 8/2020 | Roth ...................... | B60P 1/435 |
| 10,837,222 B2* | 11/2020 | Slabaugh ................. | E06B 3/52 |
| 11,299,083 B2* | 4/2022 | Green ...................... | B60P 1/435 |
| 2016/0096465 A1* | 4/2016 | Kauffman ................ | B60P 3/36 |
| | | | 296/162 |
| 2018/0022262 A1* | 1/2018 | Roth ....................... | E04F 15/02 |
| | | | 296/162 |
| 2018/0056845 A1* | 3/2018 | Ousley ..................... | B60P 3/34 |
| 2018/0334208 A1* | 11/2018 | Caster ...................... | B60P 3/36 |
| 2019/0210506 A1* | 7/2019 | Roth ........................ | B60P 3/36 |

* cited by examiner

*Primary Examiner* — Amy R Weisberg
*Assistant Examiner* — Veronica M Shull
(74) *Attorney, Agent, or Firm* — MARSHALL, GERSTEIN & BORUN LLP

(57) ABSTRACT

A patio railing assembly for a recreational vehicle having a ramp door includes a first side wall and a second side wall that are pivotably mounted to the recreational vehicle. The side walls each include a static portion and a slidable portion coupled to the static portion and movable between a retracted position and an extended position. An end wall of the patio railing assembly includes a first portion pivotably mounted to the first side wall and a second portion pivotably mounted to the second side wall. In a storage configuration, the first portion of the end wall is configured to nest within the first side wall, the second portion of the end wall is configured to nest within the second side wall, and the first and second side walls are configured to extend along one another with the slidable portions thereof in the retracted position.

20 Claims, 9 Drawing Sheets

PATIO FOR RECREATIONAL VEHICLES AND METHODS OF ASSEMBLY

CROSS-REFERENCE TO RELATED APPLICATION

This application claims the benefit of U.S. Provisional Application No. 63/135,995, filed Jan. 11, 2021, the entire contents of which are incorporated by reference herein in its entirety.

FIELD OF THE DISCLOSURE

The present disclosure generally relates to recreational vehicles and, more particularly, to patios for recreational vehicles.

BACKGROUND

Toy hauler recreational vehicles ("RV") use ramp style doors to load and unload additional vehicles into a rearward compartment. When the ramp door is not closed for travel or being used as a loading ramp it may be used as a patio. Often legs extending from the door or cables may support the door parallel to the ground on which the RV is parked. Using the structure of the ramp door is advantageous because the ramp door is necessarily sturdy enough to support the weight of other vehicles being driven over the door. Therefore, it is possible to have an extremely rigid and safe patio system that minimizes additional weight to the RV.

One type of patio railing assembly are designed to collapse and swing into an interior of the RV for storage when the ramp door is closed. This configuration takes up space in the interior of the RV when the patio railing assembly is in the storage configuration. Vehicles and other objects commonly stored and transported in RVs take up a lot of space and, as such, a patio railing assembly having a storage configuration as compact as possible is needed.

SUMMARY

In accordance with a first aspect, a patio railing assembly for a recreational vehicle having a ramp door is disclosed herein. The patio railing assembly includes a first side wall and a second side wall, each of the side walls having a proximal end configured to be pivotably mounted to the recreational vehicle and a distal end. The first and second side walls include a static portion and a slidable portion coupled to the static portion and movable between a retracted position and an extended position. The patio railing assembly further includes an end wall having a first portion pivotably mounted to the first side wall and a second portion pivotably mounted to the second side wall. In a storage configuration, the first portion of the end wall is configured to nest within the first side wall, the second portion of the end wall is configured to nest within the second side wall, and the first and second side walls are configured to extend along one another with the slidable portions thereof in the retracted position.

In some forms, the patio railing assembly can include one or more of the following aspects: the slidable portions of the first side wall and the second side wall can telescopingly receive the static portions therein; at least one of the first side wall or the second side wall can include a stop, such as a releasable snap button, preventing movement of the slidable portion relative to the static portion from the retracted position; the first portion of the end wall can be configured to nest within the slidable portion of the first side wall in the storage configuration and the second portion of the end is configured to nest within the slidable portion of the second side wall in the storage configuration; at least one of the first side wall or the second side wall can include a retainer configured to releasably hold the first portion of the end wall or the second portion of the end wall, respectively, in the storage configuration; the patio railing assembly can include a strap configured to hold the first side wall and the second side wall together in the storage configuration; the first side wall and the second side wall can include a fabric covering extending between the proximal end and the distal end, where the fabric covering has a gathered state with the slidable portion in the retracted position and a taut state with the slidable portion in the extended position, where the taut state restricts further movement of the slidable portion relative to the static portion; or the first portion and the second portion of the end wall can each include a downwardly depending shield that extends along the first side wall and the second wall, respectively, in the storage configuration and is disposed adjacent to the ramp door in a use configuration.

In some forms, the first portion of the end wall can be a wall portion and the second portion of the end wall can be a door, and the end wall can further include a coupling arrangement including a pin and a notch configured to receive the pin to couple the wall portion and the door together in a use configuration. In further forms, the patio railing assembly can be provided in combination with the recreational vehicle having the ramp door. The combination can further include a first lock releasably coupling the first side wall to the ramp door with the slidable portion in the extended position, a second lock releasably coupling the second side wall to the ramp door with the slidable portion in the extended position, and a third lock releasably coupling the door of the end wall to the ramp door.

In accordance with a second aspect, a method for use of a patio railing assembly for a ramp door of a recreational vehicle is disclosed that includes pivoting a first side wall from a storage position within an interior of the recreational vehicle to a use position, where the first side wall has a first portion of an end wall in a nested position therein; sliding a slidable portion of the first side wall relative to a static portion of the first side wall from a retracted position to an extended position to extend a length of the first side wall; pivoting the first portion of the end wall from the nested position within the first side wall to a use position extending transversely from the first side wall; pivoting a second side wall from a storage position within the interior of the recreational vehicle to a use position, where the second side wall having a second portion of the end wall in a nested position therein; sliding a slidable portion of the second side wall relative to a static portion of the second side wall from a retracted position to an extended position to extend a length of the second side wall; and pivoting the second portion of the end wall from the nested position within the second side wall to a use position extending transversely from the second side wall.

In some forms, the method can include one or more of the following aspects: telescopingly sliding the slidable portions of the first side wall and the second side wall relative to the static portions; preventing movement of the slidable portions from the retracted position with releasable stops of the first side wall and the second side wall; releasing a strap holding the first side wall and the second side wall together in the storage position; or holding the first portion of the end wall in the nested position with a first retainer coupled to the first side wall and holding the second portion of the end wall in the nested position with a second retainer coupled to the second side wall.

In some forms, the first portion of the end wall can be a wall portion and the second portion of the end wall can be a door, and the method can include coupling a pin and a notch arrangement of the end wall, where the notch is configured to receive the pin to couple the wall portion and the door together in a use configuration. In further forms, the method can include locking the first side wall into the use position with a first lock releasably coupling the first side wall to the ramp door, locking the second side wall into the use position with a second lock releasably coupling the second side wall to the ramp door, and locking the wall portion of the end wall into use position with a third lock releasably coupling the wall portion of the end wall.

In some forms, the method can include pivoting the second portion of the end wall from the use position to the nested position within the second side wall, sliding the slidable portion of the second side wall relative to the static portion of the second side wall from the extended position to the retracted position, pivoting the second side wall from the use position to the storage position within the interior of the recreational vehicle, pivoting the first portion of the end wall from the use position to the nested position within the first side wall, sliding the slidable portion of the first side wall relative to the static portion of the first side wall from the extended position to the retracted position, and pivoting the first side wall from the use position to the storage position within the interior of the recreational vehicle, such that the first side wall with the first portion of the end wall nested therein and the second side wall with the second portion of the end wall nested therein extend along one another. In further forms, the method can include securing a strap around the first side wall and the second side wall to hold the first side wall and the second side wall together in the storage position.

DETAILED DESCRIPTION

A patio railing assembly is described herein that utilizes the interior surface of a ramp door of a recreational vehicle ("RV") to create a patio enclosure. The patio railing assembly advantageously has a compact storage configuration, which minimizes the interior space of the RV occupied by the assembly and maximizes the interior space remaining for storage of other items.

Figure 1:
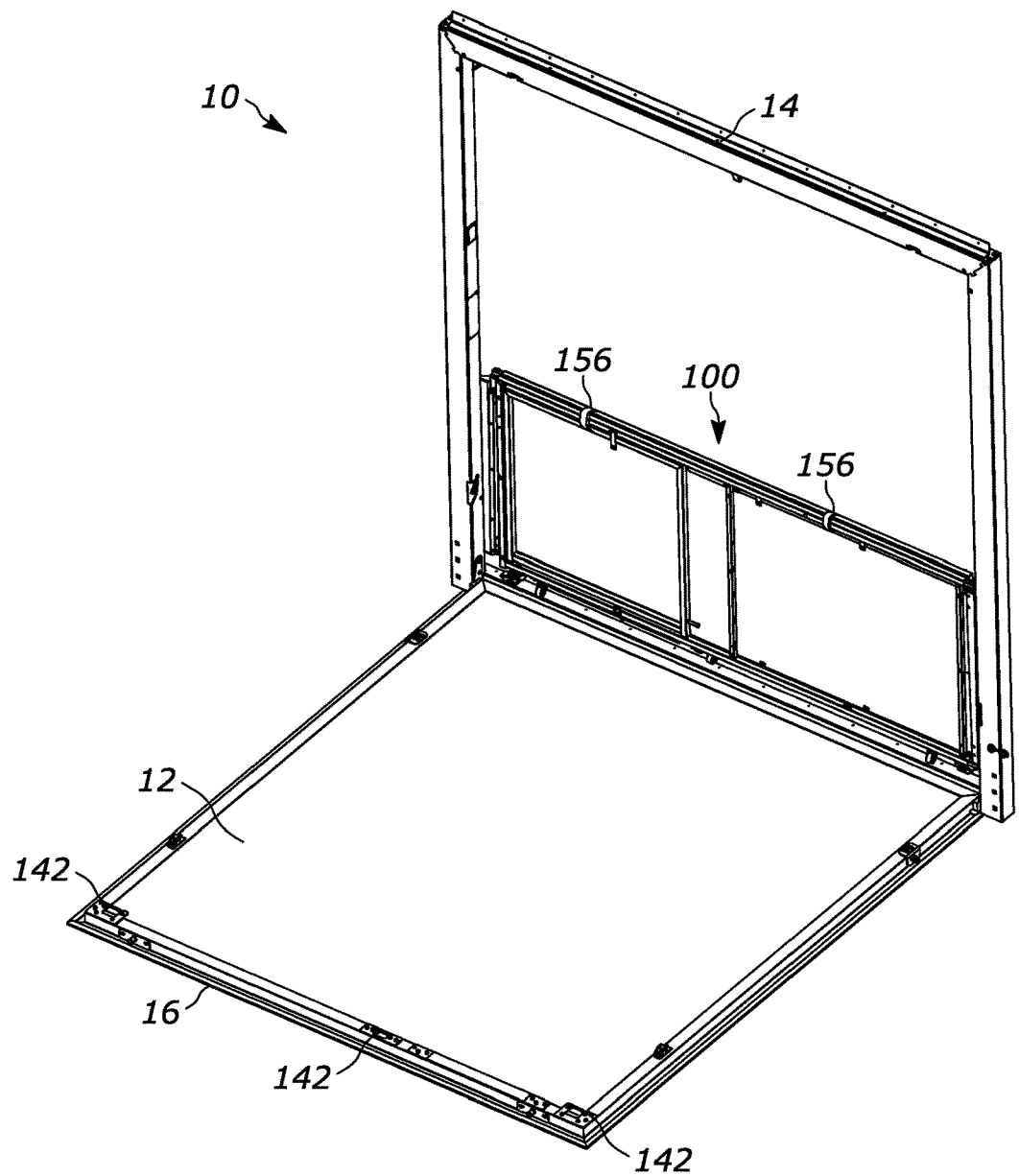
FIG. 1 is a perspective view of a patio for a recreational vehicle showing a patio railing assembly in a storage configuration and a ramp door in accordance with various embodiments.

An example patio 10 including a patio railing assembly 100 described below is shown in a storage configuration in FIG. 1 and a deployed, use configuration in FIG. 5. The patio 10 utilizes a ramp door 12 of a recreational vehicle (not shown)("RV) as a floor of the patio 10. The ramp door 12 is pivotably mounted to a door frame 14 of the RV. The ramp door 12 can be pivoted between from a generally vertical, closed position extending within the door frame 14 to a ramp position where a top edge 16 of the ramp door 12 contacts the ground to enable objects to be easily loaded into and unloaded from the RV. As shown in FIG. 1, the ramp door 12 can also have a suspended position over the ground surface where the ramp door 12 is held in a generally horizontal position by jack stands (not shown) and/or cables (not shown) attached to the door frame 14. It will be understood that other suitable methods can be utilized to support the ramp door 12 over the ground surface. The RV can be a towable trailer or a motorized unit.

Figure 3:
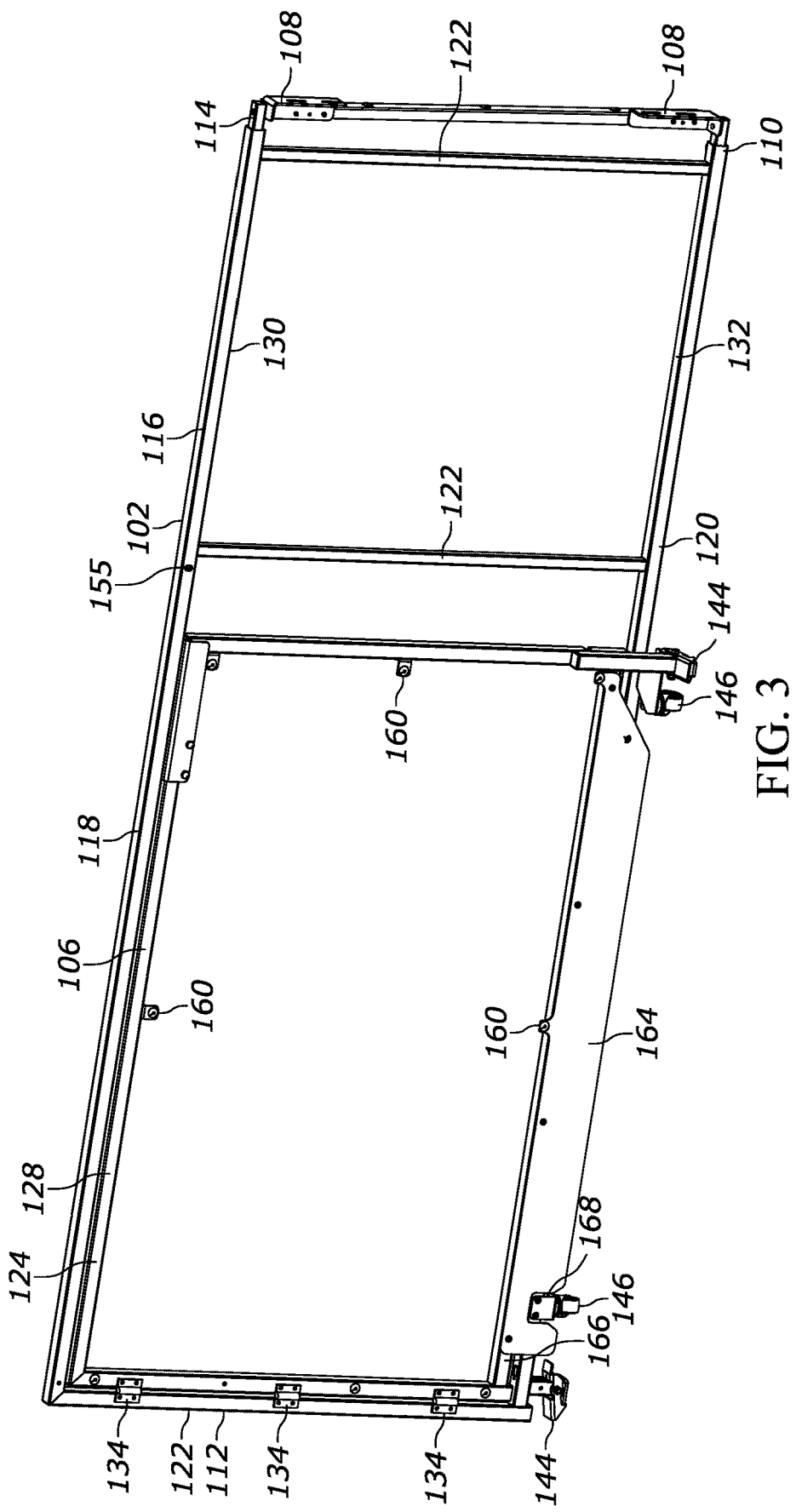
FIG. 3 is a perspective view of a first side wall and a first portion of an end wall of the patio railing assembly of FIG. 1 in the storage configuration.
Figure 4:
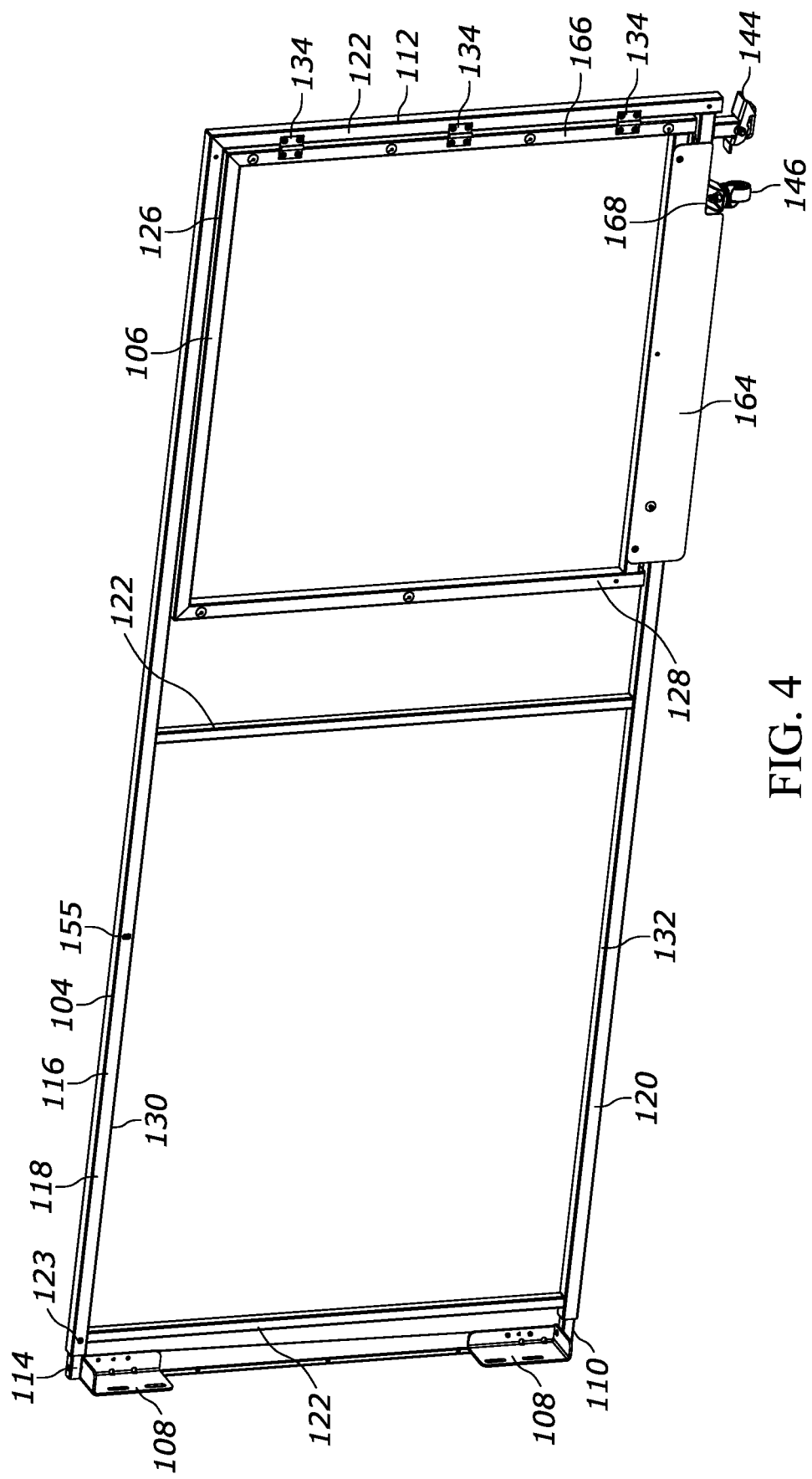
FIG. 4 is a perspective view of a second side wall and a second portion of an end wall of the patio railing assembly of FIG. 1 in the storage configuration.
Figure 5:
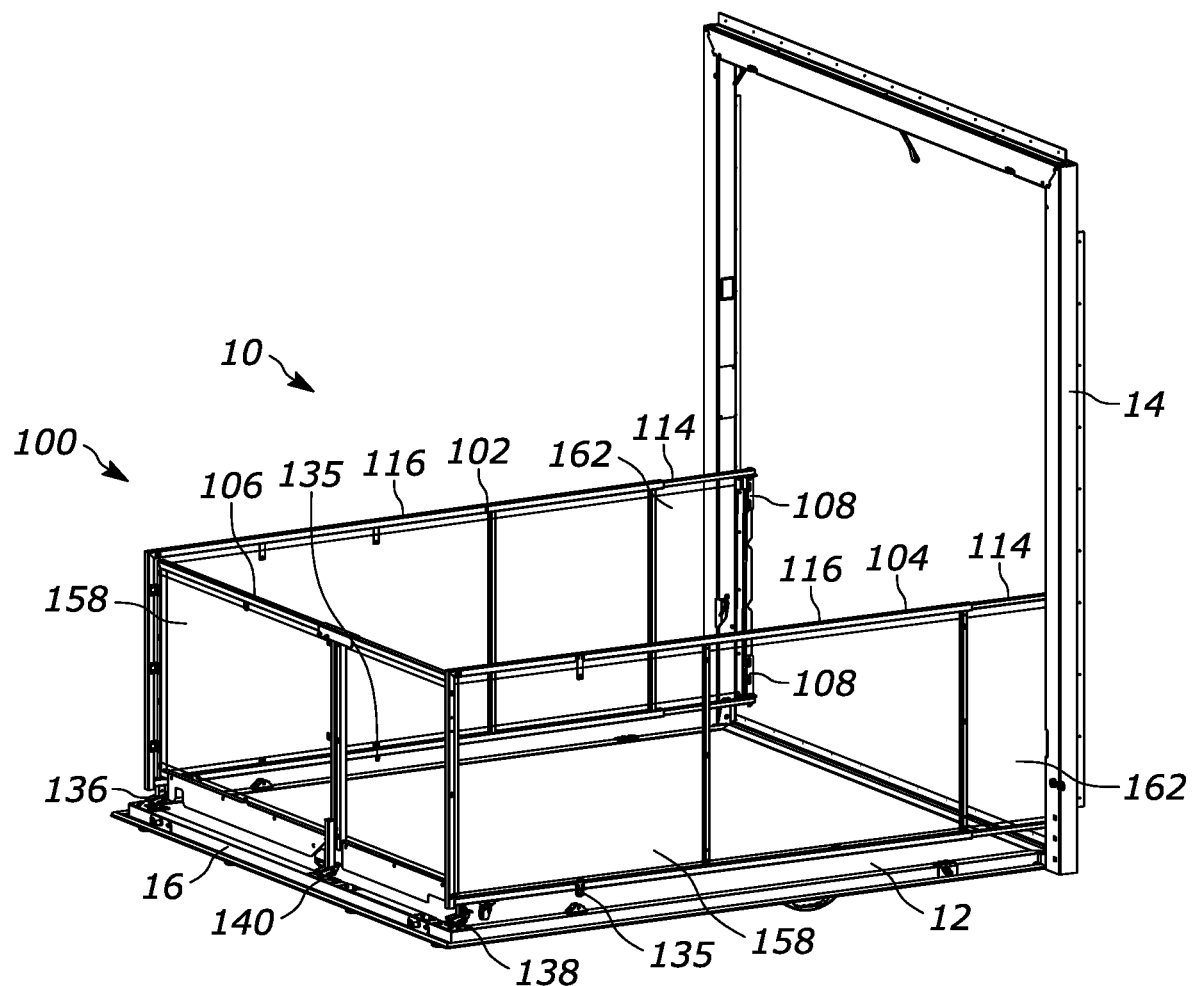
FIG. 5 is a perspective view of the patio for a recreational vehicle of FIG. 1 showing the patio railing assembly in a use configuration on the ramp door.
Figure 6:
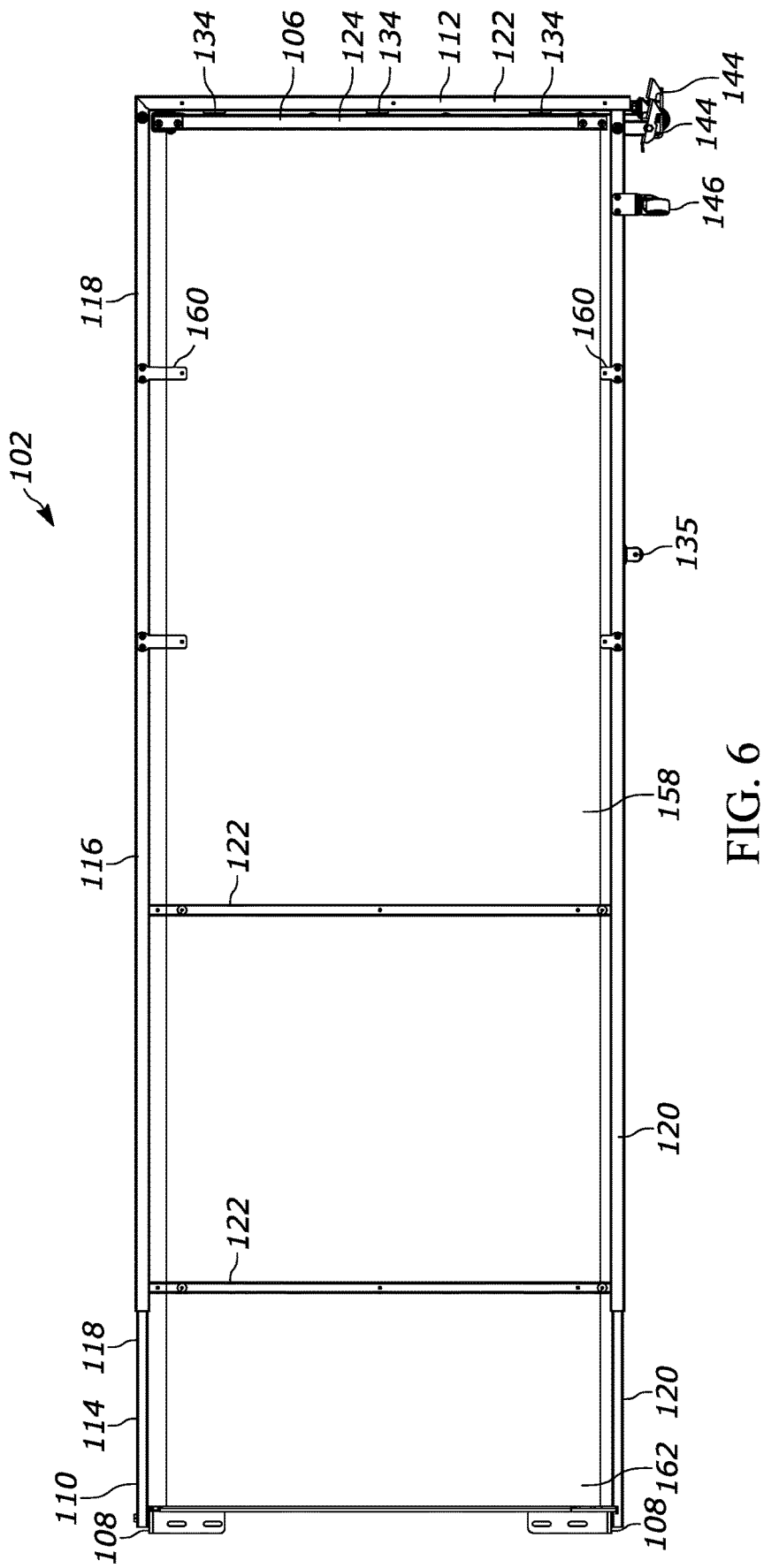
FIG. 6 is a side elevational view of the first side wall of the patio railing assembly of FIG. 5 in the use configuration.
Figure 7:
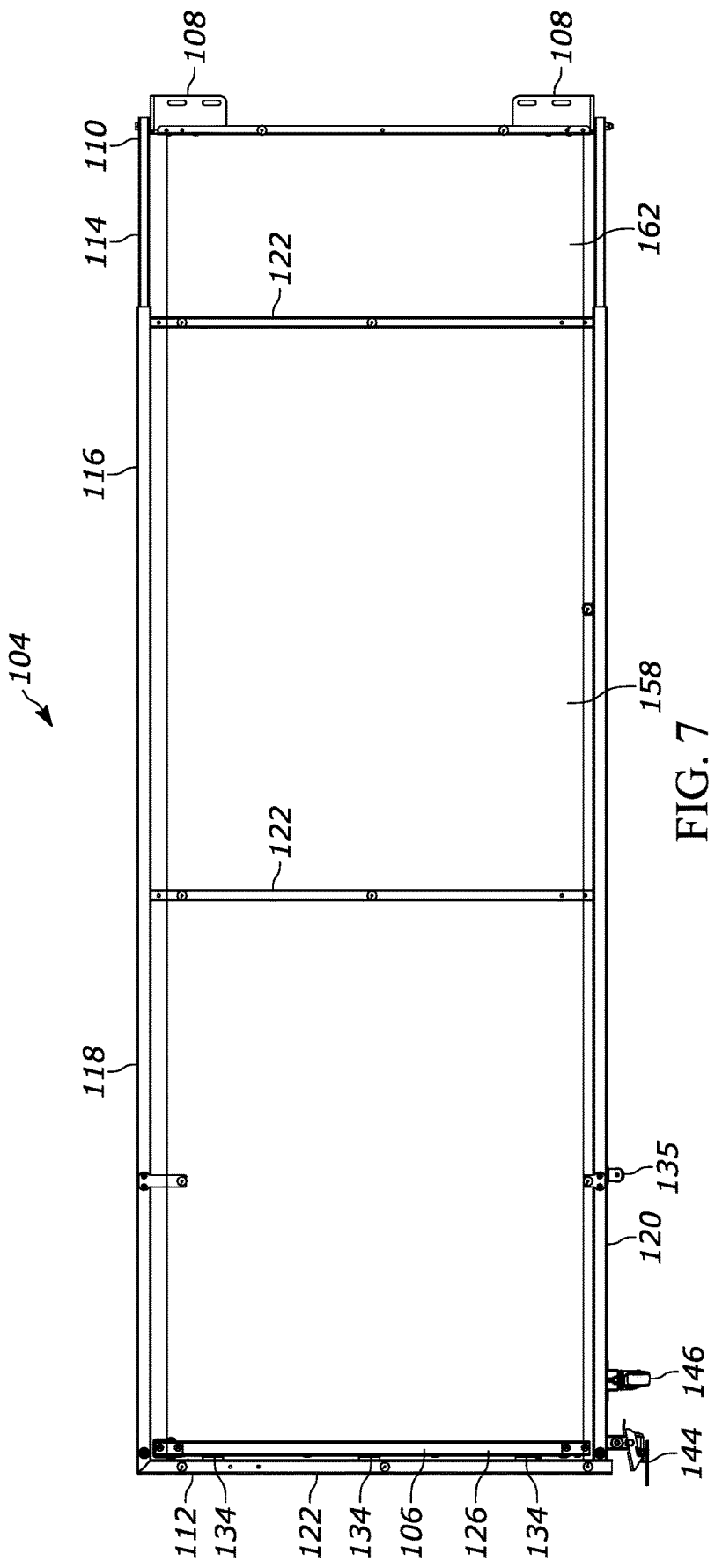
FIG. 7 is a side elevational view of the second side wall of the patio railing assembly of FIG. 5 in the use configuration.

Details of the patio railing assembly 100 are shown in FIGS. 1-10. The patio railing assembly 100 includes a first side wall 102, a second side wall 104, and an end wall 106. The patio railing assembly 100 is configured to be movable from a storage configuration, as shown in FIG. 1, where the patio railing assembly 100 is folded to extend within the door frame 14 and a use configuration, as shown in FIG. 5, where the first and second side walls 102, 104 are pivoted to extend away from the RV and the end wall 106 extends between the first and second side walls 102, 104 to extend around a perimeter of the ramp door 12. Advantageously, the nesting configuration of the end wall 106 results in the body or frame the end wall not contributing any width to the patio railing assembly 100 in the storage configuration. As a result, the storage configuration of the patio railing assembly 100 is compact, having an upper width corresponding to the combined width of the first side wall 102 and the second side wall 104. It will be understood that the upper width of the patio railing assembly 100 corresponds to a width spaced from a floor of the RV. For example, components of locks or wheels for the assembly 100 can extend laterally outwardly further than the combined width of the first and second side walls 102, 104 because vehicles typically stored in RV are longest spaced from the floor of the RV due to the curvature of the vehicles' wheels.

The first and second side walls 102, 104 pivotably attach to a structure of the RV, such as the door frame 14 as shown, by hinges 108. Such that the first and second side walls 102, 104 can be pivoted from the storage configuration extending within the door frame 14 along one another to the use configuration extending along the ramp door 12 in the suspended position. For example, the first and second side walls 102, 104 can extend outwardly from the door frame 14 at a generally (e.g., within 1-10 degrees) perpendicular angle. It will be understood that the connection of the patio railing assembly 100 to the structure of the RV can also include any additional brackets and the like for suitable operability.

As shown in FIGS. 3, 4, 6, and 7, each of the side walls 102, 104 includes a proximal end 110 pivotably coupled to the hinges 108 and an opposite distal end 112. The side walls 102, 104 have a two part construction, with a static portion 114 at the proximal end 110 and a slidable portion 116 at the distal end 112. With this configuration, the slidable portion 116 can be moved relative to the static portion 114 from a retracted position giving the side wall 102, 104 a reduced length to an extended position giving the side wall 102, 104 an extended length. In the illustrated form, the static portion 114 is telescopingly coupled to the slidable portion 116. Other sliding configurations can alternatively be utilized if desired.

In one example, the static and slidable portions 114, 116 each include upper and lower frame members 118, 120, and the slidable portions 116 further include cross frame members 122 extending between the upper and lower frame members 118, 120. With this configuration, the upper and lower frame members 118, 120 of the static portion 114 are slidingly coupled to the upper and lower frame member 118, 120 of the sliding portion 116, such as telescopingly received therein. The slidable portions 116 can include any desired number of cross-frame members 122, such as three as shown, to provide sufficient bracing to maintain shape and provide strength to the side wall 102, 104. Additionally, the first and second side walls 102, 104 can include bumpers 123 coupled to one or more of the members 118, 120, 122 to cushion the side walls 102, 104 when the side walls 102, 104 are in the nested configuration.

Figure 8:
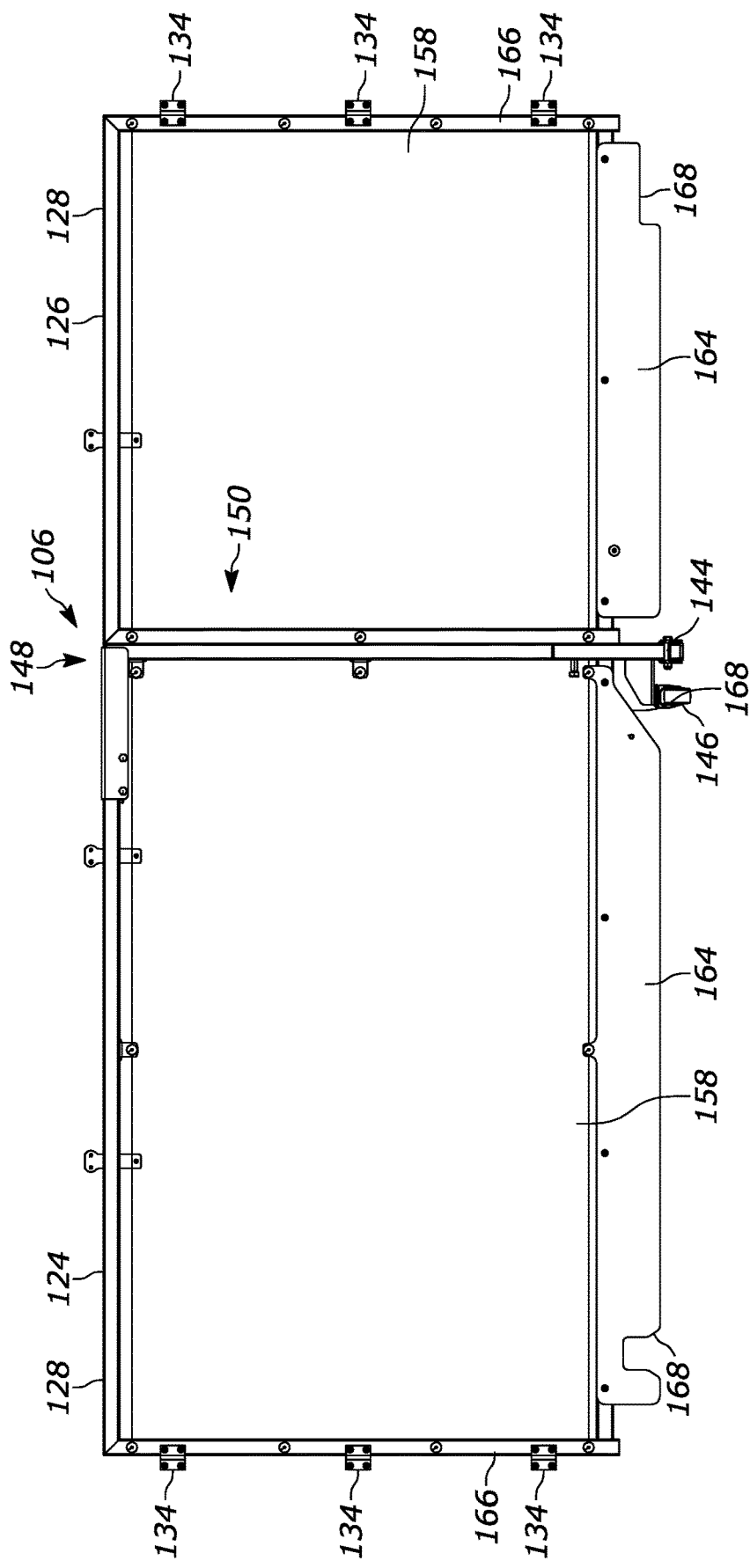
FIG. 8 is a side elevational view of the end wall of the patio railing assembly of FIG. 5 in the use configuration.
Figure 9:
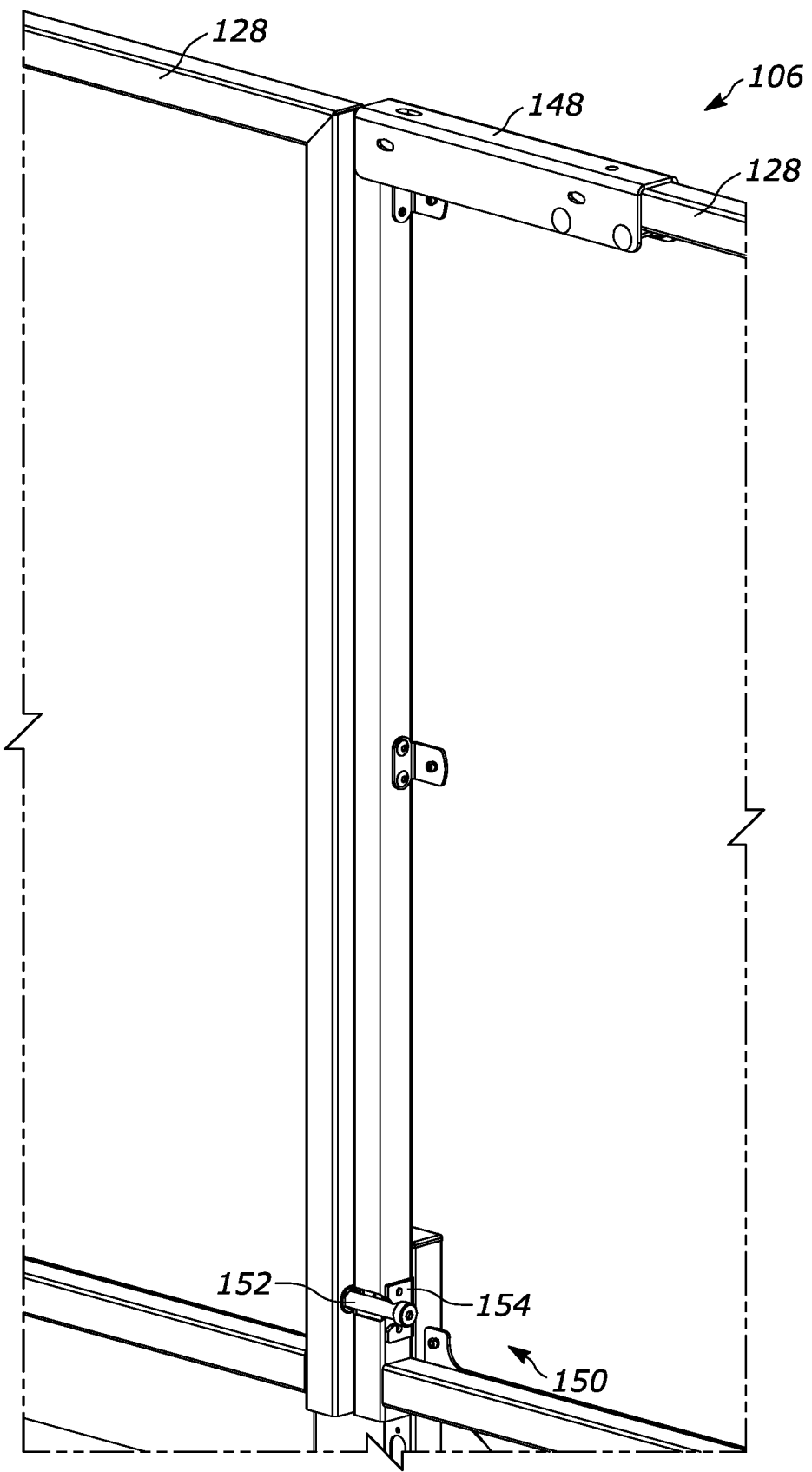
FIG. 9 is a sectional perspective view of a coupling arrangement for the first and second portions of the end wall of the patio railing assembly of FIG. 5 in the use configuration.

As shown in FIG. 8, the end wall 106 is divided into first and second portions 124, 126 that are pivotably coupled to the first and second side walls 102, 104 respectively. The end wall portions 124, 126 can have a rectangular frame 128 with a height sized to fit between the upper and lower frame members 118, 120 of the side walls 102, 104 and a width sized to fit between the cross-frame members 122 of the side walls 102, 104. With a depth equal to or less than a depth of the side walls, the end wall portions 124, 126 can fully nest within the side walls 118, 120. Pursuant to this, the end wall portions 124, 126 can be pivotably coupled to an interior surface 130, e.g., facing an interior of the patio in the use configuration, of the distal cross-frame members 122 by pivot connections 134. Although three pivot connections 134 are shown for each end wall portion 124, 126, it will be understood that any number of pivot connections 134 can be utilized. In an alternative example, the end wall portions 124, 126 can be pivotably coupled to interior surfaces, e.g., facing one another, of the upper and lower frame members 118, 120 of each of the side walls 102, 104 by pivot connections. The pivot connections 134 can take any suitable form, such as hinges as shown, and can extend directly from the end wall portions 124, 126 or can be secured thereto with brackets, pins, and so forth.

To releasably secure the end wall portions 124, 126 in the nested configuration, each of the side walls 102, 104 can include a retainer 135. The retainer 135 can take any suitable form, such as a magnet to engage the frame 128 of the end wall portions 124, 126, a strap, a hook-and-loop fastener, a snap fit connector, and so forth.

Components of the patio railing assembly 100 can be configured to releasably secure to the ramp door 12 to hold the assembly 100 in the use configuration. For example, as shown in FIG. 5, the assembly 100 can include a first lock 136 configured to secure the first side wall 102 to the ramp door 12, a second lock 138 configured to secure the second side wall 104 to the ramp door 12, and a third lock 140 configured to secure one of the end wall portions 124, 126 to the ramp door 12. The locks 136, 138, 140 can take any desired form.

Figure 10:
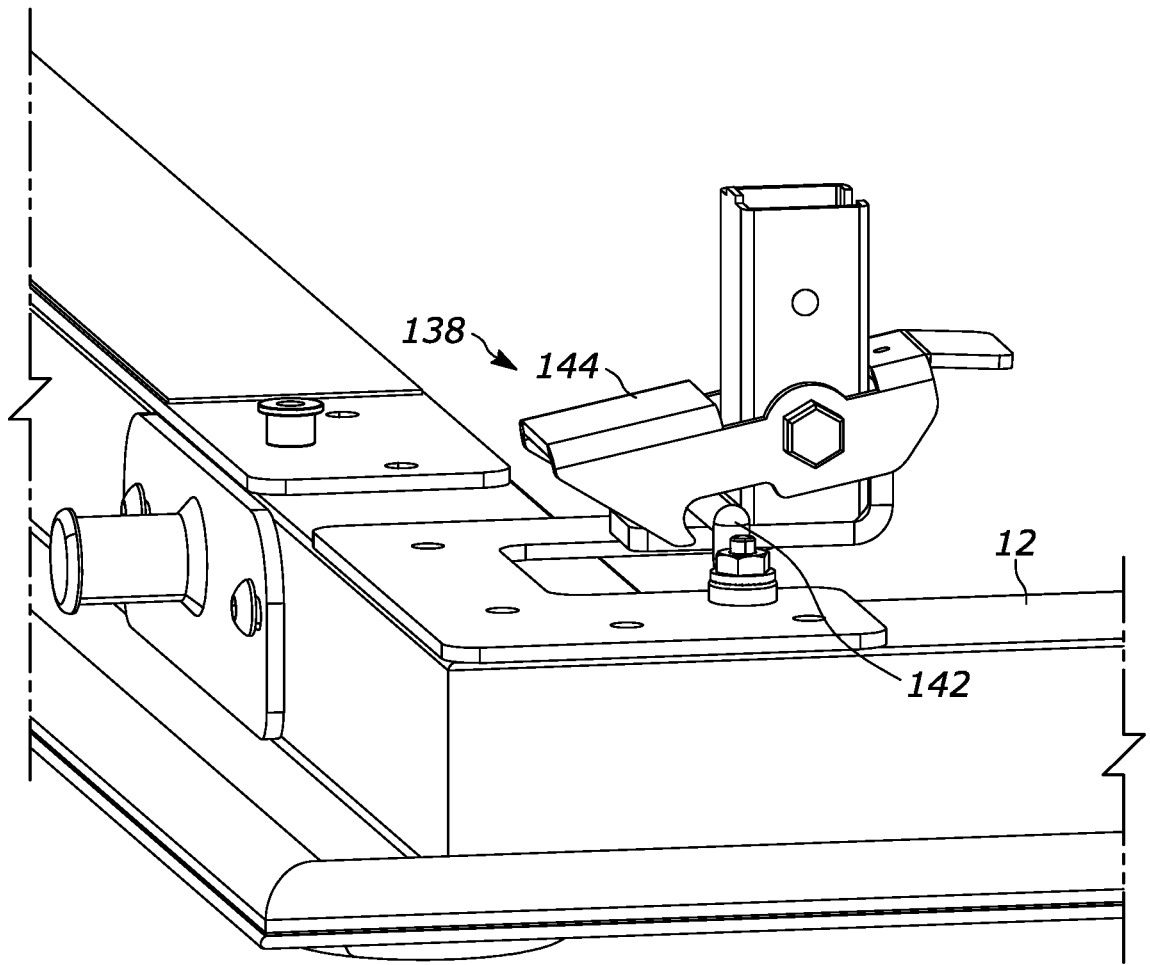
FIG. 10 is a sectional perspective view of a lock releasably coupling the patio railing assembly of FIG. 5 to the ramp door.

In the illustrated example, as best shown in FIG. 10, each of the locks 136, 138, 140 includes a lock bar 142 secured to the ramp door 12 and spaced therefrom and a locking foot 144 configured to releasably secure to the lock bar 142 coupled to each of the first side wall 102, the second side wall 104, and the one of the end wall portions 124, 126. For example, the locking foot 144 can include spring-biased jaws that can be opened to insert the locking bar 142 therein and released to retain the locking bar 142. The locking feet 144 extend downwardly to be positioned adjacent to the ramp door 12.

As shown, the locking feet 144 of the side walls 102, 104 can be coupled to the slidable portions 116 thereof, such that the locking feet 144 can be moved along the ramp door 12 when the slidable portions 116 are moved to the extended position. The lock bars 142 for the side walls 102, 104 can be positioned on the ramp door 12 to correspond to the extended position of the side walls 102, 104 to thereby hold the side walls 102, 104 in the use configuration. So configured, the side walls 102, 104 can be pivoted to position and the slidable portions 116 thereof can be moved to the extended position, which thereby engages the locking feet 144 with the lock bars 142. Similarly, the lock bar 142 for the end wall 106 can be positioned to secure one of the portions 124, 126 thereof in the use position extending transversely from the respective side wall 102, 104. So configured, after the side wall 102, 104 is secured in position by the lock 136, 138, the end wall portion 124, 126 can be pivoted with respect thereto, which thereby engages the locking foot 144 with the lock bar 142. As shown, the lock bars 142 are disposed adjacent to the top edge 16 of the ramp door 12.

In order to aid a user in moving the side walls 102, 104 and end wall 106 between the storage and use configurations, each can include a caster 146 or other wheel so that the side walls 102, 104 and one or both of the end wall portions 124, 126 can be wheeled across the ramp door 12. For example, the casters 146 can be mounted adjacent to the distal end 112 of the side walls 102, 104.

As shown in FIG. 8, one of the first and second portions 124, 126 can be a door to provide an access point to the patio 10. For example, the first portion 124 can be a wall portion with the locking foot 144 coupled thereto, while the second portion 126 can be door that can be selectively pivoted to enter and exit the patio 10. As a result of the third lock 140, the wall portion 124 is prevented from moving and the door 126 can be pivoted with respect thereto. To lock movement of the door 126, the end wall 106 can include a lock 148 that releasably couples the wall portion and door 124, 126 together. For example, the lock 148 can be a slider movably coupled to the top of the frames 128 of the end wall portions 124, 126 that can be selectively slid to extend over both the frames 128 preventing movement of the door 126. Other lock mechanisms, such as a latch, aligned openings with a lock, friction fit, etc. can alternatively be utilized.

By one approach, the end wall 106 can also include a coupling arrangement 150 that extends between the wall portion and door 124, 126, which operates to hold the wall portion and door 124, 126 in a closed position. The coupling arrangement 150 can include a pin 152 and a notch 154 that frictionally receives the pin 152 therein with the end wall 106 in the use configuration. For example, the pin 152 can extend laterally outwardly from the door 126, such that when the door 126 is pivoted to the use configuration, the pin 152 is inserted into the notch 154 of the wall portion 124. The opposite configuration can alternatively be utilized. The coupling of the pin 152 and the notch 154 maintains the trueness of the end wall 106 and, through the pivot connections 134, the trueness of the side walls 102, 104.

In some instances, it may be desirable to control the extension of the side walls 102, 104 to prevent the slidable portion 116 from inadvertently moving from the retracted position to the extended position. In these embodiments, the side walls 102, 104 can include a releasable stop 155, as shown in FIGS. 3 and 4, that cooperates with the static and slidable portions 114, 116. In one example, the stop 155 can take the form of a snap button coupled to the static portion 114 and an opening defined in the slidable portion 116. With this configuration, the snap button extends through the opening with the slidable portion 116 in the retracted position. Then when use of the patio 10 is desired, the user can depress the snap button, which allows the slidable portion 116 to be moved to the extended position. Of course, other stops can be utilized, such as friction fit, a latch, snap-fit, and so forth.

Figure 2:
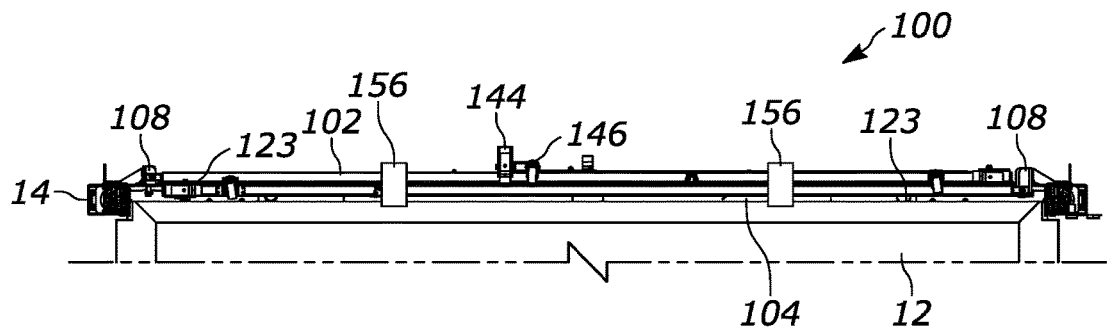
FIG. 2 is a sectional top view of the patio railing assembly of FIG. 1 in the storage configuration.

To secure the patio railing assembly 100 in the storage configuration, the assembly 100 can further include one or more straps 156, as shown in FIG. 2, that can be secured around at least the first and second side walls 102, 104 with the side walls 102, 104 extending along one another in the storage configuration. The straps 156 can secure together by any suitable method. For example, the straps 156 can be tied, can include a hook-and-loop fastener, can include a buckle, and so forth. In some forms, the straps 156 can also be configured to extend around one or both of the end wall portions 124, 126 to hold all of the walls 102, 104, 106 in the storage configuration.

For additional privacy, the patio railing assembly 100 can also include a covering 158 that extends along one or more of the walls 102, 104, 106. For example, the covering 158 can extend between the proximal and distal ends 110, 112 of the side walls 102, 104 and across the frame 128 of the end wall portions 124, 126. The covering 158 can be made of any desired material, such as fabric, plastic, and so forth. The covering 158 can be secured to directly to frame members of the walls 102, 104, 106 or the walls 102, 104, 106 can include mounting tabs 160 that extend into an interior of the frames 128. For at least the side walls 102, 104, the covering 158 can be flexible or can include a flexible portion 162 that can have a gathered state with the slidable portion 116 in the retracted position and a taut state with the slidable portion 116 in the extended position. Advantageously, the covering 158 can be sized such that the taut state corresponds to the slidable portions 116 being in the extended position and restricts further movement of the slidable portion 116 relative to the static portion 114.

As shown in FIGS. 5 and 8, the frames 128 of the end wall portions 124, 126 are spaced from the ramp door 12 in the use configuration a greater amount than the side walls 102, 104 due to the nesting storage configuration. To block at least some of this open space, the end wall portions 124, 126 can further include downwardly depending shields 164 that extend from an outer surface 166 of the frames 128. This allows the shields 164 to extend along the lower member 120 of the sidewalls 102, 104 with the end wall portions 124, 126 in the storage configuration. As shown, the shields 164 can include cut outs 168 to allow structure, such as the casters 146, the locking feet 144 or other components to pass therethrough when the patio railing assembly 100 is pivoted between the storage and use configurations. Additionally, the cut outs 168 can accommodate other structures, such as a staircase or components therefor mounted to the ramp door 12.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A patio railing assembly for a recreational vehicle having a ramp door, the patio railing assembly comprising:
a first side wall having a proximal end configured to be pivotably mounted to the recreational vehicle and a distal end, the first side wall including a static portion and a slidable portion coupled to the static portion and movable between a retracted position and an extended position;
a second side wall having a proximal end configured to be pivotably mounted to the recreational vehicle and a distal end, the second side wall including a static portion and a slidable portion coupled to the static portion and movable between a retracted position and an extended position; and
an end wall having a first portion pivotably mounted to the first side wall and a second portion pivotably mounted to the second side wall;
wherein, in a storage configuration, the first portion of the end wall is configured to nest within the first side wall, the second portion of the end wall is configured to nest within the second side wall; and the first and second side walls are configured to extend along one another with the slidable portions thereof in the retracted position.

2. The patio railing assembly of claim 1, wherein the slidable portions of the first side wall and the second side wall telescopingly receive the static portions therein.

3. The patio railing assembly of claim 1, wherein at least one of the first side wall or the second side wall include a stop preventing movement of the slidable portion relative to the static portion from the retracted position.

4. The patio railing assembly of claim 3, wherein the stop comprises a releasable snap button.

5. The patio railing assembly of claim 1, wherein the first portion of the end wall is configured to nest within the slidable portion of the first side wall in the storage configuration and the second portion of the end is configured to nest within the slidable portion of the second side wall in the storage configuration.

6. The patio railing assembly of claim 1, wherein at least one of the first side wall or the second side wall include a retainer configured to releasably hold the first portion of the end wall or the second portion of the end wall, respectively, in the storage configuration.

7. The patio railing assembly of claim 1, further comprising a strap configured to hold the first side wall and the second side wall together in the storage configuration.

8. The patio railing assembly of claim 1, wherein the first side wall and the second side wall each further comprise a fabric covering extending between the proximal end and the distal end, the fabric covering having a gathered state with the slidable portion in the retracted position and a taut state with the slidable portion in the extended position, the taut state restricting further movement of the slidable portion relative to the static portion.

9. The patio railing assembly of claim 1, wherein the first portion and the second portion of the end wall each include a downwardly depending shield that extends along the first side wall and the second wall, respectively, in the storage configuration and is disposed adjacent to the ramp door in a use configuration.

10. The patio railing assembly of claim 1, wherein the first portion of the end wall comprises a wall portion and the second portion of the end wall comprises a door, and the end wall further comprises a coupling arrangement including a pin and a notch configured to receive the pin to couple the wall portion and the door together in a use configuration.

11. The patio railing assembly of claim 10 in combination with the recreational vehicle, further comprising a first lock releasably coupling the first side wall to the ramp door with the slidable portion in the extended position, a second lock releasably coupling the second side wall to the ramp door with the slidable portion in the extended position, and a third lock releasably coupling the door of the end wall to the ramp door.

12. A method for use of a patio railing assembly for a ramp door of a recreational vehicle, the method comprising:
pivoting a first side wall from a storage position within an interior of the recreational vehicle to a use position, the first side wall having a first portion of an end wall in a nested position therein;
sliding a slidable portion of the first side wall relative to a static portion of the first side wall from a retracted position to an extended position to extend a length of the first side wall;
pivoting the first portion of the end wall from the nested position within the first side wall to a use position extending transversely from the first side wall;
pivoting a second side wall from a storage position within the interior of the recreational vehicle to a use position, the second side wall having a second portion of the end wall in a nested position therein;
sliding a slidable portion of the second side wall relative to a static portion of the second side wall from a retracted position to an extended position to extend a length of the second side wall; and
pivoting the second portion of the end wall from the nested position within the second side wall to a use position extending transversely from the second side wall.

13. The method of claim 12, wherein sliding the slidable portions of the first side wall and the second side wall relative to the static portions thereof comprises telescopingly sliding the slidable portions of the first side wall and the second side wall relative to the static portions.

14. The method of claim 12, further comprising preventing movement of the slidable portions from the retracted position with releasable stops of the first side wall and the second side wall.

15. The method of claim 12, further comprising releasing a strap holding the first side wall and the second side wall together in the storage position.

16. The method of claim 12, further comprising:
holding the first portion of the end wall in the nested position with a first retainer coupled to the first side wall; and
holding the second portion of the end wall in the nested position with a second retainer coupled to the second side wall.

17. The method of claim 12, wherein the first portion of the end wall comprises a wall portion and the second portion of the end wall comprises a door, and further comprising coupling a pin and a notch arrangement of the end wall, where the notch is configured to receive the pin to couple the wall portion and the door together in a use configuration.

18. The method of claim 17, further comprising:
locking the first side wall into the use position with a first lock releasably coupling the first side wall to the ramp door;
locking the second side wall into the use position with a second lock releasably coupling the second side wall to the ramp door; and
locking the wall portion of the end wall into use position with a third lock releasably coupling the wall portion of the end wall.

19. The method of claim 12, further comprising:
pivoting the second portion of the end wall from the use position to the nested position within the second side wall;
sliding the slidable portion of the second side wall relative to the static portion of the second side wall from the extended position to the retracted position;
pivoting the second side wall from the use position to the storage position within the interior of the recreational vehicle;
pivoting the first portion of the end wall from the use position to the nested position within the first side wall;
sliding the slidable portion of the first side wall relative to the static portion of the first side wall from the extended position to the retracted position; and
pivoting the first side wall from the use position to the storage position within the interior of the recreational vehicle, such that the first side wall with the first portion of the end wall nested therein and the second side wall with the second portion of the end wall nested therein extend along one another.

20. The method of claim 19, further comprising securing a strap around the first side wall and the second side wall to hold the first side wall and the second side wall together in the storage position.

* * * * *